(12) United States Patent
Lawrence

(10) Patent No.: US 9,057,393 B1
(45) Date of Patent: Jun. 16, 2015

(54) WINDOW HARDWARE ANCHOR

(71) Applicant: Barry G. Lawrence, Thomasville, NC (US)

(72) Inventor: Barry G. Lawrence, Thomasville, NC (US)

(*) Notice: Subject to any disclaimer, the term of this patent is extended or adjusted under 35 U.S.C. 154(b) by 0 days.

(21) Appl. No.: 14/228,443

(22) Filed: Mar. 28, 2014

(51) Int. Cl.
    *F16B 37/04* (2006.01)
    *F16B 5/02* (2006.01)

(52) U.S. Cl.
    CPC .......................................... *F16B 5/02* (2013.01)

(58) Field of Classification Search
    USPC ......... 411/174, 182, 183, 187, 188, 508–509; 16/211, 220; 292/240
    See application file for complete search history.

(56) References Cited

U.S. PATENT DOCUMENTS

| | | | | |
|---|---|---|---|---|
| RE22,618 E | * | 3/1945 | Johnson | 411/112 |
| 2,836,214 A | * | 5/1958 | Rapata | 411/182 |
| 2,975,814 A | * | 3/1961 | Tinnerman | 411/182 |
| 3,014,563 A | * | 12/1961 | Bratton | 403/167 |
| 3,136,350 A | * | 6/1964 | Rapata | 411/182 |
| 3,869,958 A | * | 3/1975 | Murayama | 411/15 |
| 4,971,500 A | * | 11/1990 | Benoit et al. | 411/182 |
| 5,290,137 A | * | 3/1994 | Duffy, Jr. | 411/80.1 |
| 5,294,225 A | * | 3/1994 | Kazino et al. | 411/182 |
| 5,593,262 A | * | 1/1997 | Gedeon et al. | 411/182 |
| 5,746,559 A | * | 5/1998 | Shirai | 411/182 |
| 7,008,159 B2 | * | 3/2006 | Dendo | 411/182 |
| 2013/0125471 A1 | | 5/2013 | Benevenga et al. | 49/449 |

\* cited by examiner

*Primary Examiner* — Roberta Delisle
(74) *Attorney, Agent, or Firm* — Blake P. Hurt

(57) ABSTRACT

A window hardware anchor formed from a base and a pair of walls defining a central channel therebetween. The walls each form a spreadable projection at the end opposing the base and combine to define an anchor head. A pair of shoulders are attached in opposing relation on the outside of different walls, such that when a fastener is received in the central channel, the head and the shoulders laterally displace to form a stable attachment platform for desired window hardware.

19 Claims, 6 Drawing Sheets

WINDOW HARDWARE ANCHOR

FIELD OF THE INVENTION

The invention herein pertains to window hardware and particularly pertains to insertable window hardware anchors positioned within the hollow extrusion of a moveable window sash for securing window latches and locks thereto.

DESCRIPTION OF THE PRIOR ART AND OBJECTIVES OF THE INVENTION

Single and double hung windows have gained popularity recently due to their ease of manufacturing, installation, use, and cleaning. Sash locks and latches are often mounted to a sash rail by fasteners such as screws that are driven through the hardware body and engage the material of the sash rail. Depending on the window material, holes may be drilled prior to installation once the hardware position is determined. This method works well with wooden window sashes but is less advantageous for vinyl or composite window sashes that typically include an extruded frame with a hollow interior to reduce weight and material cost. Fasteners do not hold well in such windows, leading to installed hardware that twists or slides during use. This is a particularly egregious problem with the twisting or sliding leading to misalignment between locks or latches and associated keepers, resulting in windows that are not properly secured. This problem has been addressed in the past by adding a reinforcing material such as a metal strip (sometimes referred to as rebar) inside the sash to receive the fasteners installed from above. This increases the number of window components, assembly steps, and window cost. Other attempts have relied on toggle anchors affixed to the installed window hardware that operate similar to conventional drywall anchors (also known as a balance anchor), in that they receive a fastener and expand at the bottom (see for example U.S. Patent Publication No. 2013/0125471 to Benevenga). By expanding from the bottom of the anchor, this option offers little in the way of a solution to the problem above. Further, by driving the fasteners from above, the resulting hardware displays unsightly and aesthetically unpleasing screws and the like.

Thus, in view of the problems and disadvantages associated with prior art devices, the present invention was conceived and one of its objectives is to provide a window hardware anchor for securely attaching window hardware to a sash formed from vinyl or other composite materials.

It is another objective of the present invention to provide a window hardware anchor that robustly affixes window hardware to an extruded sash without need of metal reinforcement or rebar.

It is still another objective of the present invention to provide a window hardware anchor that prevents or reduces the head rotation of fasteners used to attach window hardware to a sash.

It is yet another objective of the present invention to provide a window hardware anchor that can be used with a window lock which includes hidden or aesthetically pleasing attachment hardware.

It is a further objective of the present invention to provide a window lock with a receiver in combination with a window hardware anchor that prevents the rotation of the lock about square and round fastener heads.

It is still a further objective of the present invention to provide a window hardware anchor defining a central channel attached to one or more extendable projections that widen as the anchor is urged towards the sash rail top, for example by a screw.

It is yet a further objective of the present invention to provide a window hardware anchor that defines a circular anchor base.

It is a further objective of the present invention to provide a window hardware anchor that includes an anchor base defining the shape of a square.

It is still another objective of the present invention to provide a window hardware anchor that defines a rib or fin projecting vertically to engage a receiver.

It is another objective of the present invention to provide a window hardware anchor that is snapably insertable into an aperture formed in a sash.

Various other objectives and advantages of the present invention will become apparent to those skilled in the art as a more detailed description is set forth below.

SUMMARY OF THE INVENTION

The aforesaid and other objectives are realized by providing a window hardware anchor defining a central channel connected to a plurality of spreadable projections forming a head. The anchor is snapably inserted into an aperture formed in the top surface of a sash and is releasably held in place by a pair of shoulders formed on the anchor exterior surface. A window lock defining a receiver on a bottom surface is positioned above the anchor and threaded fasteners such as screws are inserted through the lock housing and received within the central channel. As the fastener is tightened, the anchor head is widened as it receives the wider diameter fastener, mechanically urging the projections and the shoulders to displace laterally as the fastener augers, until the projections contact the receiver side walls and the shoulders contact the underside of the sash, preventing lock rotation and anchor overexpansion. The resulting attachment is structurally more stable than the prior art due to the increased surface area contacting the projections and limits torsional displacement by the lock housing and fastener due to the receiver contacting the anchor projections in addition to the shortened longitudinal length of the anchor due to the augered fastener.

DETAILED DESCRIPTION OF THE PREFERRED EMBODIMENT AND OPERATION OF THE INVENTION

Figure 1:
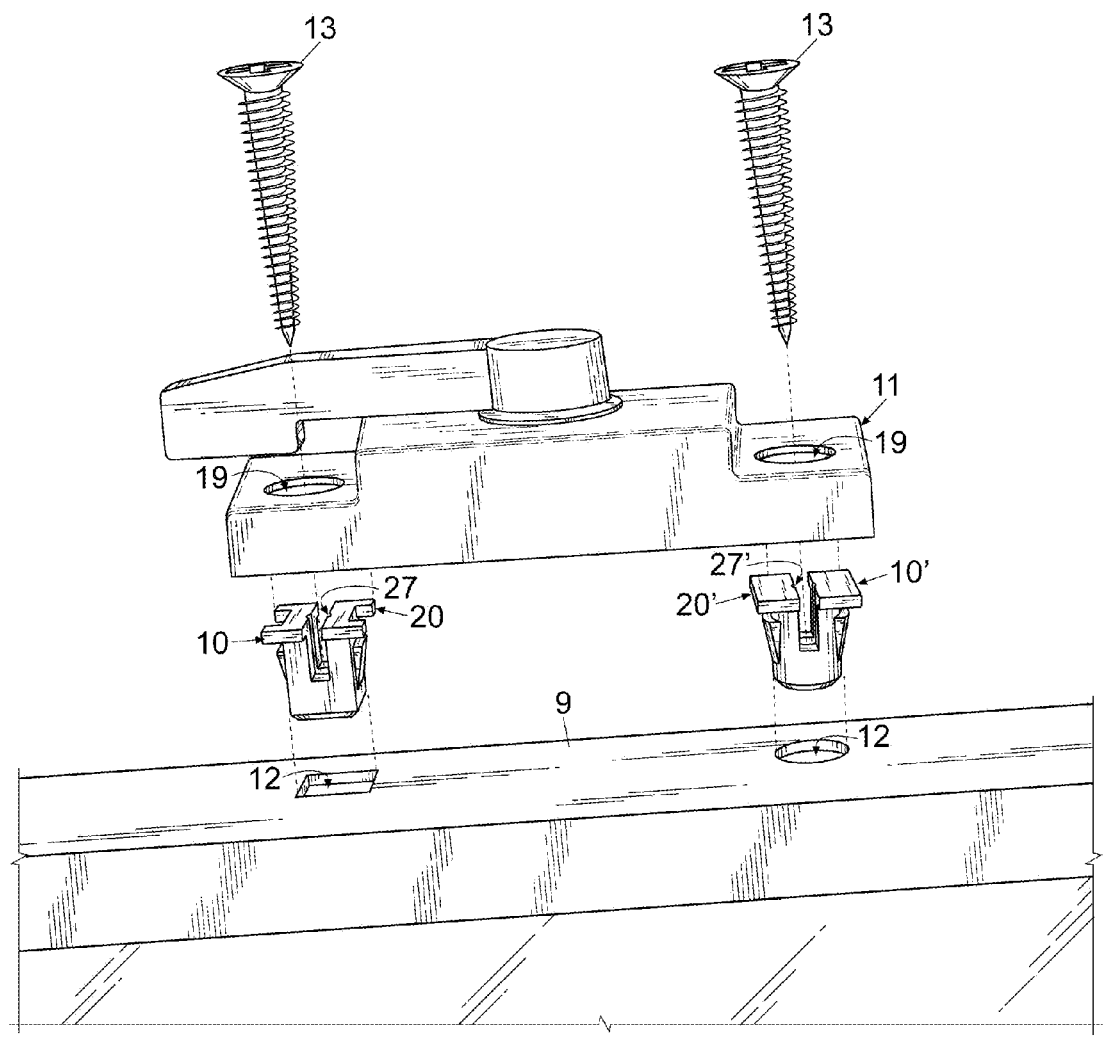
FIG. 1 shows a side perspective view of a window sash with two embodiments of hardware anchors, a window lock and fasteners exploded therefrom.
Figure 4:
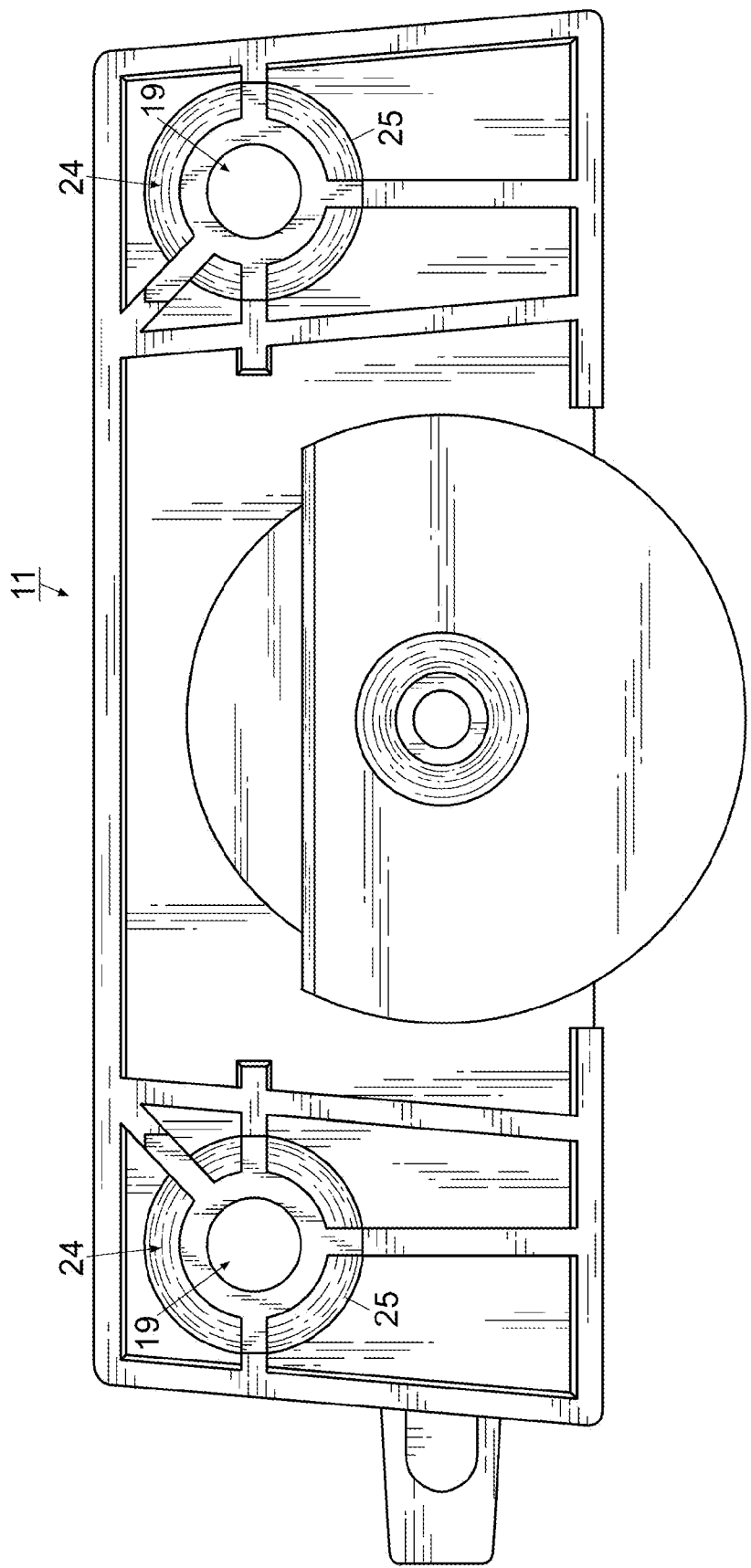
FIG. 4 demonstrates a bottom plan view of the lock of FIG. 1.

For a better understanding of the invention and its operation, turning now to the drawings, FIG. 1 shows an exploded side perspective view of window sash 9, hardware anchors 10, 10', lock 11 and fasteners 13. Sash 9 defines one or more apertures 12 in the top surface sized to receive anchors 10, 10'. Although only two apertures 12 are represented in FIG. 1, it should be understood that any number of apertures 12 could be formed in sash 9 to correspond with the desired number of anchors 10, 10', for example if additional anchors 10, 10' were needed to secure a particularly unstable window lock 11 or associated keeper (not shown). Window lock 11 is shown in FIGS. 1 and 4 as the window hardware to engage anchors 10, 10' via fasteners 13 and to be secured to sash 9, although it should be recognized that any window hardware fastened atop window sash 9 such as other lock styles, latches, keepers, and the like may also enjoy the benefits of anchors 10, 10'.

Hardware anchors 10, 10' may be formed from any suitable material that can withstand the torsion forces imparted on anchors 10, 10' by window lock 11, but preferred anchors 10, 10' are manufactured from a polymeric material such as nylon for its efficiency in cost and durability during use. Anchors 10, 10' each include respectively bases 14, 14' attached to a pair of parallel side walls 15, 15'. Base 14 preferably defines a square cross-section while base 14' defines a circular cross-section (see FIG. 6), but alternate embodiments of hardware anchors 10, 10' may include bases that define any desired cross-section shape, including regular and irregular polynomial shapes as required to engage sash apertures 12. Hardware anchors 10, 10' are not limited by the size of bases 14, 14', but each of bases 14, 14' defines circular apertures 16, 16' respectively in the bottom surface opposite walls 15, 15' sized to receive the terminal end of threaded fasteners 13, and bases 14, 14' should be of sufficient width to securely engage fasteners 13, such that fasteners 13 cannot be inadvertently displaced without a great deal of force. Bases 14, 14' may define a planar exterior surface but preferably include beveled edges 17, 17', which allows respective anchors 10, 10' to be manually inserted into sash apertures 12 that define slightly smaller area or circumference than that of anchors 10, 10'. Therefore, there is a substantial, frictional engagement between sash 9 and anchors 10, 10' without the use of noxious and potentially toxic adhesives.

Bases 14, 14' are each connected to one or more respective side walls 15, 15'. In the case of anchor 10, base 14 is affixed to the proximal ends 28 of a pair of parallel, substantially planar walls 15 extending perpendicularly relative to base 14. The embodiment of anchor 10' includes base 14' which is attached to respectively the proximal ends 28' of a pair of arcuate, substantially semi-circular walls 15' extending perpendicularly relative to base 14'. In each case, while bases 14, 14' may be attached to any number of walls 15, 15', preferred bases 14, 14' are connected to a pair of walls 15, 15' slightly spaced apart from one another (approximately one sixteenth of an inch (0.0625")) defining respectively central channels 18, 18'. Although the distance is not recited to be limiting, embodiments of anchor 10, 10' should include central channels 18, 18' which allows walls 15, 15' the flexibility to angle wider when engaged by fastener 13 as will be described in greater detail below. Without central channels 18, 18', the structural stability offered by anchors 10, 10' require larger, more unwieldily, and costly solutions to this problem in addition to substantially more torsional force applied.

Figure 2:
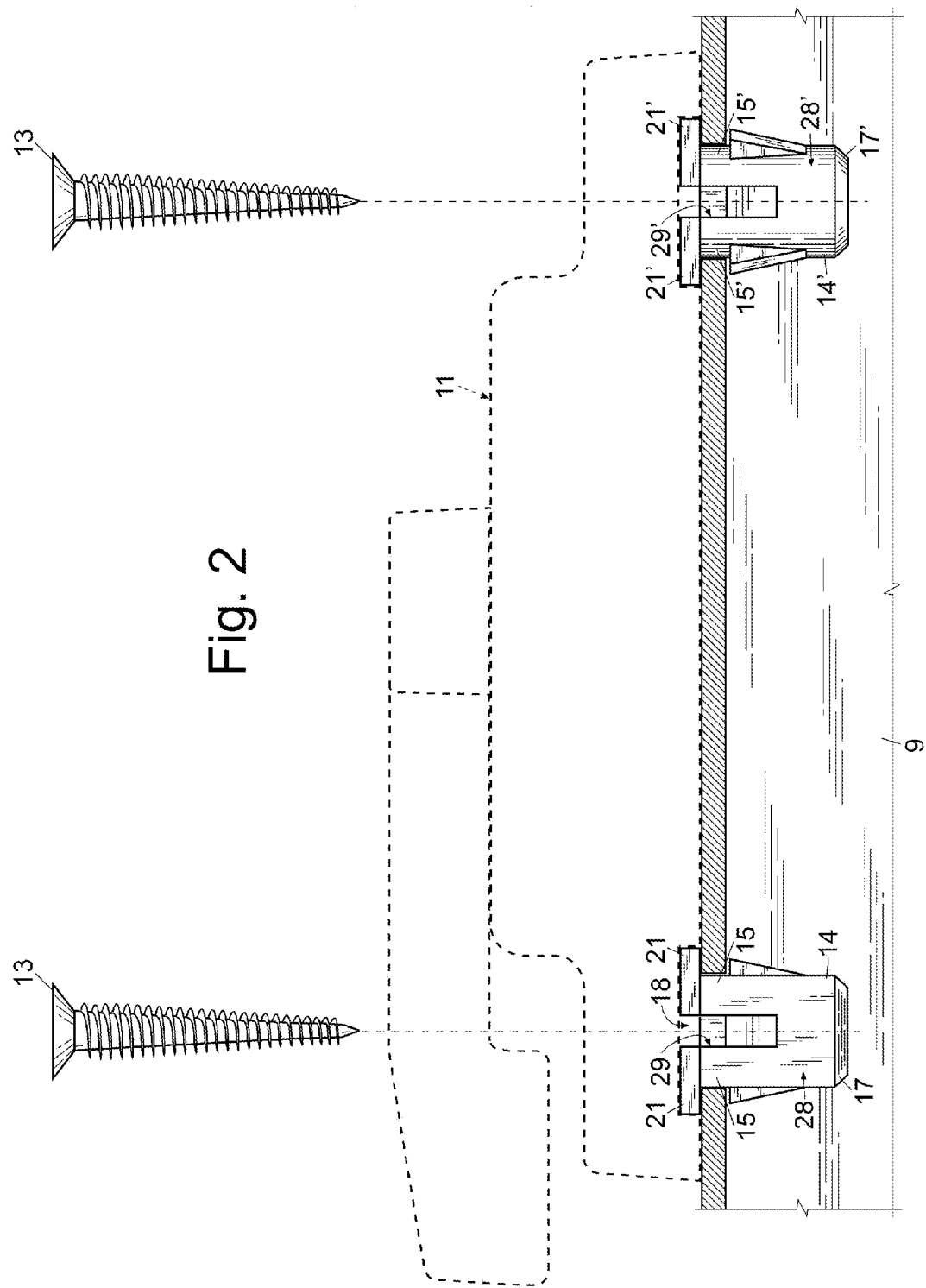
FIG. 2 pictures an elevated side cutaway view of the sash of FIG. 1 with the anchor embodiments installed prior to fastener engagement.
Figure 3:
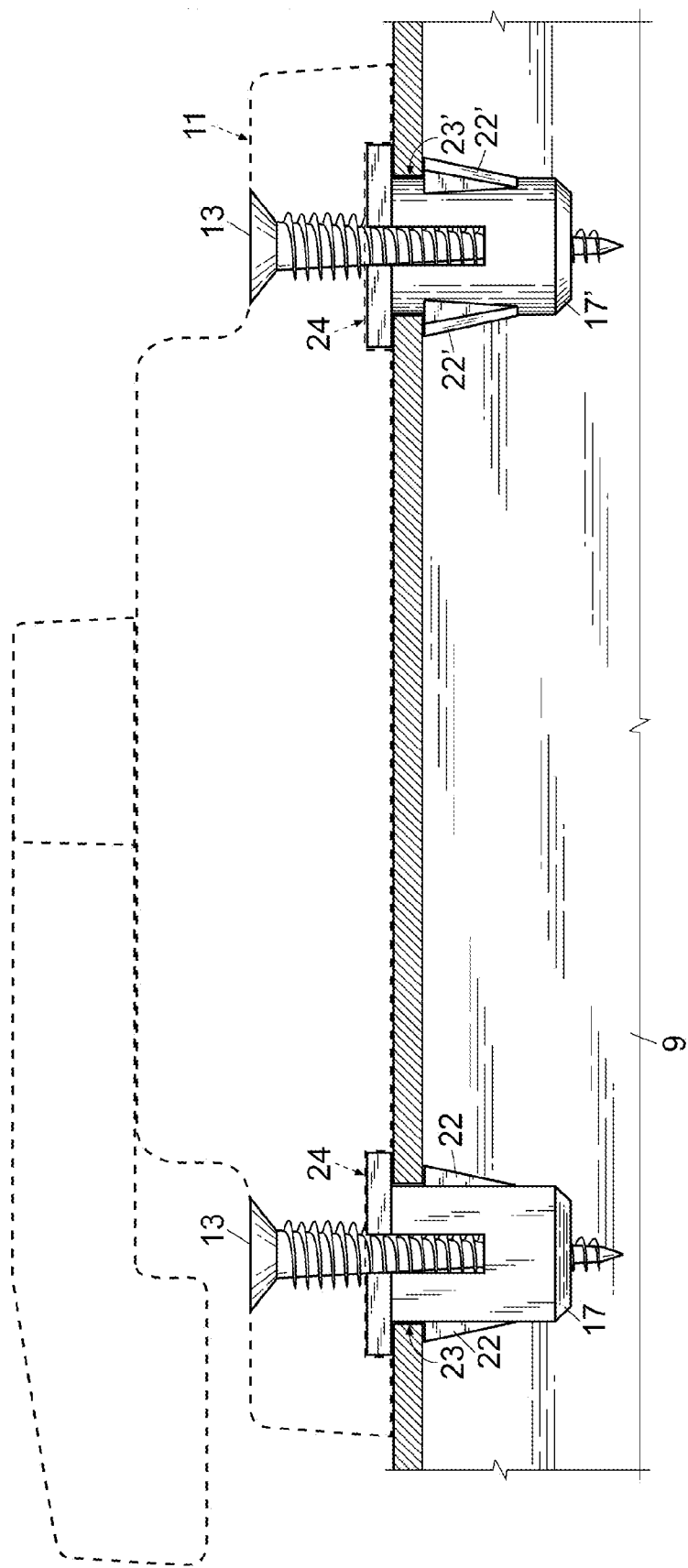
FIG. 3 depicts an elevated side cutaway view of the sash of FIG. 1 with the anchor embodiments installed and secured with fasteners.
Figure 6:
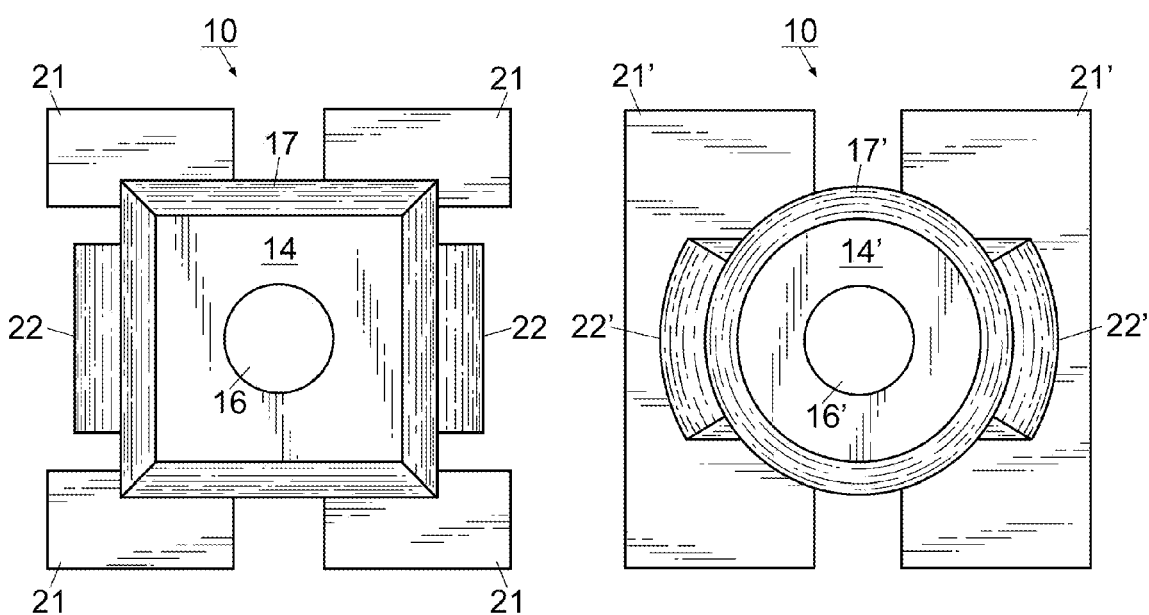
FIG. 6 shows an elevated bottom view of the hardware anchors as seen in FIG. 2 with the sash removed.

Each of side walls 15, 15' may respectively define one or more projections 21, 21' at distal ends 29, 29' opposing bases 14, 14'. Projections 21 preferably each define a C-shape while projections 21' define a rectangular shape as seen in FIGS. 1 and 6, but it should be understood that the shapes defined by projections 21, 21' should not but construed to limit the structure or application of anchors 10, 10'. Projections 21 and 21' each respectively combine in embodiments of anchor 10, 10' to form anchor heads 20, 20', the structure that frictionally engages the upper surface of window sash 9 when stable installation of lock housing 11 is desired as seen in FIGS. 2 and 3. In embodiments of anchors 10, 10', anchor heads 20 and 20' may define respective opposing notch pairs 27, 27' (FIG. 1) which serve as an entry point for fasteners 13 into central channels 18, 18'. Without notch pairs 27, 27', fasteners 13 may angle away from central channel 18 during installation and provide ineffective attachment between lock housing 11 and anchors 10, 10'. Notch pairs 27, 27' are optimally positioned about midway longitudinally on projections 21, 21' and are preferably positioned in axial orientation relative to housing aperture 19 as seen in FIG. 4.

Side walls 15, 15' may further define one or more shoulders 22, 22' (FIG. 3) on the exterior surface of respective walls 15, 15'. Shoulders 22, 22' define a V-shaped projection raising off the exterior surface of walls 15, 15', culminating in a planar ledge. The embodiment of shoulder 22 positioned on one or more walls 15 defines a planar exterior while the embodiment of shoulder 22' associated with walls 15' may define an arcuate exterior. Shoulders 22, 22' are positioned part way up walls 15, 15' but each terminate prior to reaching anchor heads 20, 20', forming gaps 23, 23' (FIG. 3). In use, anchors 10, 10' are snap fitted within apertures 12 of sash 9 whereby heads 20, 20' are above sash 9 and shoulders 22, 22' are beneath sash 9 such that sash 9 resides within gap 23. Thus when fasteners 13 auger into anchors 10, 10', gaps 23, 23' are reduced as walls 15, 15' are urged outwardly and upwardly (see FIG. 3) and anchors 10, 10' more tightly abut the bottom of sash 9.

FIG. 4 illustrates a bottom plan view of exemplary window hardware, presented here as described above as lock housing 11. Housing 11 would include the necessary components of a window lock as is conventional, but are not shown here for clarity. Window housing 11 may define one or more receivers 24 for receiving the portion of anchors 10, 10' that extend above window sash 9 after installation. Although anchor heads 20, 20' each define a shape including four corners, it is possible, particularly in the case of anchor 10' with circular base 14', for anchors 10, 10' to rotate after installation within window sash 9. To prevent loosening, and ultimately inadvertent disassociation, of fastener 13, receiver walls 25 of housing 11 are sized to receive, and frictionally engage, anchor heads 20, 20' to prevent substantial rotation of anchors 10, 10' relative to fasteners 13. It should be understood that housing receivers 24 need not be limited to rectangular openings, and may define any shape corresponding with the embodiment of anchor deployed within window sash 9 via one or more receiver walls 25.

Figure 5:
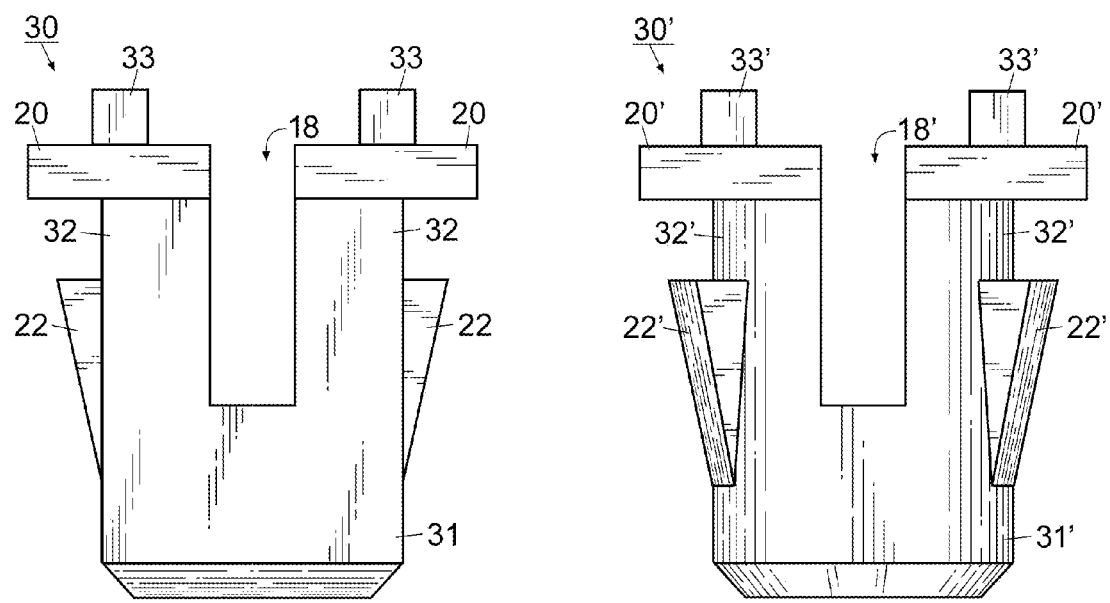
FIG. 5 illustrates an elevated side view of a pair of alternate embodiments of the hardware anchors.

FIG. 5 depicts an elevated side view of alternate embodiments 30, 30' of respective anchors 10, 10'. In addition to including bases 31, 31' attached to walls 32, 32' which are similar in all respects to bases 14, 14' and walls 15, 15', including shoulders 22, 22', anchor heads 20, 20' and central channels 18, 18', anchors 30, 30' may also include fin pairs 33, 33' that extend vertically above anchor heads 20, 20' to increase frictional engagement with receivers 24. An embodiment of receiver 24 may also include accessory structures such as grooves, ledges, or the like (not shown) to increase the frictional engagement of fin pairs 33, 33'.

A method of using hardware anchors to secure window hardware to a window sash includes the steps of providing hardware anchor 10 or 10' including base 14 or 14' and a pair of walls 15 or 15' affixed in perpendicular orientation to the respective base 14, 14' and spaced to define central channel 18 or 18' therebetween, walls 15 or 15' each defining projections or 21' combining to define anchor head 20 or 20' and shoulders 22 or 22' attached to one of walls 15, 15'. The method also includes forming aperture 12 in a window sash top surface, inserting hardware anchor 10, 10' into aperture 12, and aligning locking housing 11 over anchor 10, 10'. The method further includes the steps of attaching lock housing 11 to hardware anchor 10, 10' by inserting fastener 13 through housing aperture 19 defined in the surface of housing 11 and engaging anchor 10, 10' at anchor head notches 27, 27'. As fastener 13 is rotated, the threads of fastener 13 engage the walls of central channel 18, causing walls 15, 15' to widen and projections 21, 21' to laterally displace and increase the surface area holding lock housing 11 to window sash 9. Fastener 13 continues to auger through central channel 18 until passing through base aperture 16 and frictionally urging anchor 10, 10' towards window sash 9, reducing the size of shoulder gaps 23, 23' and frictionally engaging window sash 9 with wall shoulders 22, 22'. By placing locking housing 11 over anchor 10, 10', the portion of anchor 10, 10' and fastener 13 protruding above window sash 9 is received within receiver 24 formed on the bottom surface of housing 11, preventing inadvertent rotation of anchor 10, 10' and/or fastener 13 and the possibility of disassociation therefrom. In an alternate embodiment of the above method, anchors 30, 30' define vertical fins 33, 33' for frictionally engaging receiver 24.

The illustrations and examples provided herein are for explanatory purposes of the instant hardware anchors and are not intended to limit the scope of the appended claims.

I claim:

1. An anchor, said anchor comprising a base and a pair of walls, said walls affixed to said base in perpendicular orientation and spaced to define a central channel therebetween, said walls each defining a projection, said projections combining to define an anchor head, a first shoulder, said first shoulder attached to one of said walls, said anchor defining a fin that extends vertically above said projections, whereby said anchor head and said first shoulder each laterally displace when said central channel receives a fastener therein.

2. The anchor of claim 1 further comprising a second shoulder, said second shoulder positioned on the other of said walls in opposing relation to said first shoulder.

3. The anchor of claim 1 wherein said base defines an aperture.

4. The anchor of claim 1 wherein said base defines a square cross-section.

5. The anchor of claim 1 wherein said base defines a circular cross-section.

6. The anchor of claim 1 wherein said projections each define a C-shape.

7. The anchor of claim 1 wherein said projections each define a rectangle.

8. The anchor of claim 1 further comprising a housing, said housing defining a receiver, said receiver configured to receive said anchor head therein.

9. A window hardware anchor, said anchor comprising a base and a pair of walls oriented perpendicular to said base, each of said walls defining proximal and distal ends, each of said walls joined to said base at said proximal ends and spaced to form a central channel therebetween, each of said walls defining a spreadable projection at said distal end, said projections combining to define an anchor head, each of said projections defining a fin that extends vertically above said respective projection, a pair of shoulders, one of said shoulders attached to different ones of said walls, whereby said anchor head and said shoulders each laterally displace when said central channel receives a fastener therein.

10. The anchor of claim 9 wherein said base defines a square cross-section.

11. The anchor of claim 9 wherein said base defines a circular cross-section.

12. The anchor of claim 9 wherein said projections each define a planar, C-shape.

13. The anchor of claim 12 wherein each of said projections define a notch.

14. The anchor of claim 9 wherein said projections each define a planar rectangle.

15. The anchor of claim 14 wherein each of said projections define a notch.

16. The anchor of claim 9 wherein said base defines an aperture.

17. A window hardware anchor in combination with a housing and a fastener, said housing defining an aperture sized to receive said fastener and forming a receiver, said anchor comprising a base and a pair of walls, said walls affixed to said base in perpendicular orientation and spaced to define a central channel therebetween, said central channel narrower than said housing aperture, said walls each defining a projection, said projections combining to define an anchor head, a fin, said fin oriented vertically on said head to engage said receiver, a first shoulder, said first shoulder attached to one of said walls, whereby said head is insertable into said receiver and rotatably restricted via said fin, and whereby said head and said shoulder each laterally displace when said central channel receives said fastener therein, and whereby said head is rotatably restricted by said receiver.

18. The combination of claim 17 wherein said base defines a square cross-section.

19. The combination of claim 17 wherein said base defines a circular cross-section.

* * * * *